US009495463B2

(12) United States Patent
Allen et al.

(10) Patent No.: US 9,495,463 B2
(45) Date of Patent: *Nov. 15, 2016

(54) MANAGING DOCUMENTS IN QUESTION ANSWERING SYSTEMS

(71) Applicant: International Business Machines Corporation, Armonk, NY (US)

(72) Inventors: Corville O. Allen, Morrisville, NC (US); Richard A. Salmon, Apex, NC (US); Eric Woods, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 57 days.

This patent is subject to a terminal disclaimer.

(21) Appl. No.: 14/474,603

(22) Filed: Sep. 2, 2014

(65) Prior Publication Data

US 2015/0347569 A1    Dec. 3, 2015

Related U.S. Application Data

(63) Continuation of application No. 14/290,392, filed on May 29, 2014.

(51) Int. Cl.
*G06F 17/30* (2006.01)

(52) U.S. Cl.
CPC ..... *G06F 17/30867* (2013.01); *G06F 17/3053* (2013.01); *G06F 17/30551* (2013.01); *G06F 17/30654* (2013.01)

(58) Field of Classification Search
USPC ................................. 707/728, 748
See application file for complete search history.

(56) References Cited

U.S. PATENT DOCUMENTS

| | | | |
|---|---|---|---|
| 7,587,387 B2 * | 9/2009 | Hogue | G06F 17/30864 |
| 8,185,355 B2 | 5/2012 | Nath et al. | |
| 8,255,390 B2 | 8/2012 | Inagaki et al. | |
| 8,549,014 B2 | 10/2013 | Acharya et al. | |
| 8,601,030 B2 | 12/2013 | Bagchi et al. | |
| 8,893,276 B2 * | 11/2014 | Sutherland | G06F 21/577 |
| | | | 713/187 |
| 9,043,887 B2 * | 5/2015 | McLachlan | H04L 63/08 |
| | | | 705/2 |
| 9,396,268 B2 * | 7/2016 | Effrat | G06F 17/30867 |
| 9,396,730 B2 * | 7/2016 | Karpey | G10L 17/26 |

(Continued)

OTHER PUBLICATIONS

Allen et al., "Handling Information Source Ingestion in a Question Answering System", U.S. Appl. No. 15/157,440, filed May 18, 2016.

(Continued)

*Primary Examiner* — Kim Nguyen
(74) *Attorney, Agent, or Firm* — Nicholas D. Bowman (57) ABSTRACT

A first candidate answer to a time-sensitive question received by a question answering (QA) system is identified using a first document. A first temporal confidence subscore of the first candidate answer is then calculated using a first temporal confidence rule. A first general confidence score is then generated based on at least the first temporal confidence subscore. A second candidate answer to the question is identified using a second document. A second temporal confidence subscore of the second candidate answer is then calculated using a second temporal confidence rule. A second general confidence score is then generated based on at least the second temporal confidence subscore. The first general confidence score and the second general confidence score are then compared. Based on this comparison, a final answer is selected from the first candidate answer and the second candidate answer.

11 Claims, 6 Drawing Sheets

(56) References Cited

U.S. PATENT DOCUMENTS

| | | |
|---|---|---|
| 2005/0010553 A1 | 1/2005 | Liu |
| 2007/0196804 A1 | 8/2007 | Yoshimura et al. |
| 2009/0043749 A1 | 2/2009 | Garg et al. |
| 2012/0077178 A1 | 3/2012 | Bagchi et al. |
| 2012/0301864 A1 | 11/2012 | Bagchi et al. |
| 2013/0132308 A1 | 5/2013 | Boss et al. |
| 2013/0304730 A1 | 11/2013 | Zhou |
| 2015/0347569 A1* | 12/2015 | Allen ............... G06F 17/30654 707/728 |
| 2015/0347587 A1* | 12/2015 | Allen ............... G06F 17/30654 707/725 |
| 2016/0048514 A1 | 2/2016 | Allen et al. |

OTHER PUBLICATIONS

List of IBM Patents or Patent Applications Treated as Related, May 16, 2016, 2 pages.

Dakka, W. et al, "Answering General Time-Sensitive Queries," IEEE Transactions on Knowledge and Data Engineering, Feb. 2012, vol. 24, No. 2, pp. 220-235, IEEE Computer Society.

Kumar, V., "Effective Information Search and Retrieval for Answering Time Sensitive Queries," International Journal of Computer Technology and Applications, Nov.-Dec. 2013, Vo. 4 (6), 951-955, ISSN: 2229-6093.

Leela, R. et al., "Context Aware Time-Sensitive Queries," IJDCST, @December Issue, V-1, 1-8, SW-1, ISSN: 2320-7884, www.ijdcst.com.

Allen, C. et al., "Managing Documents in Question Answering Systems," U.S. Appl. No. 14/290,392, filed May 29, 2014.

Allen, C. et al., "Handling Information Source Ingestion in a Question Answering System," U.S. Appl. No. 14/458,435, filed Aug. 13, 2014.

IBM, "List of IBM Patents or Patent Applications Treated as Related."

* cited by examiner

MANAGING DOCUMENTS IN QUESTION ANSWERING SYSTEMS

BACKGROUND

The present disclosure relates to computer systems, and more specifically, to question answering (QA) systems.

Recent research has been directed to developing question answering (QA) systems designed to receive input questions, analyze them, and return applicable answers. These systems may rely on natural language processing, automated reasoning, machine learning, and other advanced techniques. Using these techniques, QA systems may provide mechanisms for searching large sources of content and analyzing the content with regard to a given input question in order to determine an answer to the question. In some QA systems this may take the form of hypothesis (e.g., candidate answer) generation, scoring, and ranking in order to determine one or more final output answers.

SUMMARY

According to embodiments of the present disclosure, aspects of the disclosure may include a method, a system, and a computer program product for answering a time-sensitive question received by a computer system. The method, system, and computer program product may include identifying a first candidate answer to the time-sensitive question with a first document. A first temporal confidence subscore of the first candidate answer may then be calculated using a first temporal confidence rule. A first general confidence score may then be generated based on at least the first temporal confidence subscore. The method, system, and computer program product may further include identifying a second candidate answer to the time-sensitive question with a second document. A second temporal confidence subscore of the second candidate answer may then be calculated using a second temporal confidence rule. A second general confidence score may then be generated based on at least the second temporal confidence subscore. The method, system, and computer program product may also include comparing the first general confidence score and the second general confidence score. Based on this comparison, a final answer may be selected from the first candidate answer and the second candidate answer.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of some embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to question answering (QA) systems. While the present disclosure is not necessarily limited to such applications, various aspects of the disclosure may be appreciated through a discussion of various examples using this context. Furthermore, it is contemplated that some embodiments may use or take the form of computer systems that may not be question answering systems.

Figure 1:
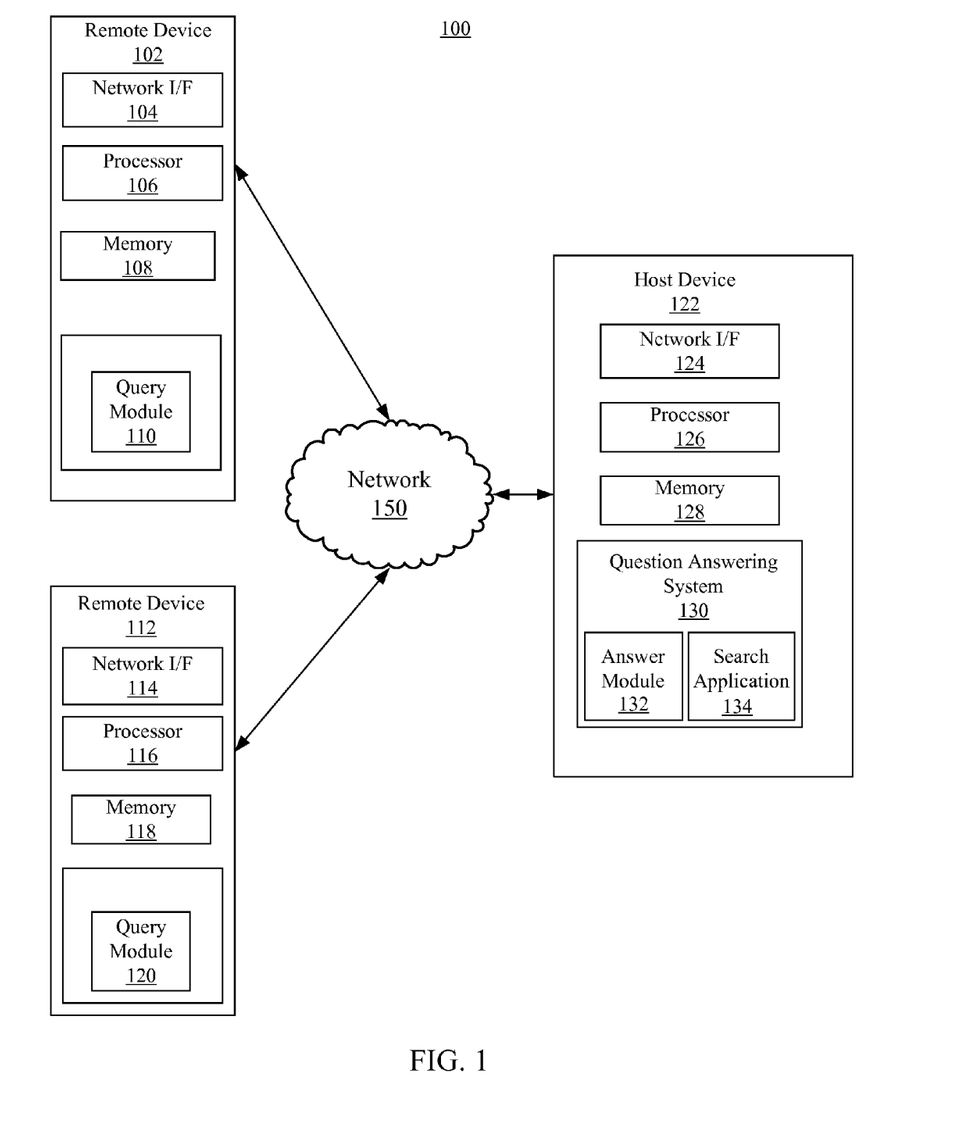
FIG. 1 illustrates a block diagram of an example computing environment for use with a question answering system, consistent with embodiments of the present disclosure.

Turning now to the figures, FIG. 1 is a block diagram of an example computing environment 100 for use with a question answering system, consistent with embodiments of the present disclosure. In some embodiments, the computing environment 100 may include one or more remote devices 102, 112 and one or more host devices 122. Remote devices 102, 112 and host device 122 may be distant from each other and communicate over a network 150 in which the host device 122 comprises a central hub from which remote devices 102, 112 can establish a communication connection. Alternatively, the host device and remote devices may be configured in any other suitable relationship (e.g., in a peer-to-peer or other relationship).

In some embodiments, the network 150 can be implemented by any number of any suitable communications media (e.g., wide area network (WAN), local area network (LAN), Internet, Intranet, etc.). Alternatively, remote devices 102, 112 and host devices 122 may be local to each other, and communicate via any appropriate local communication medium (e.g., local area network (LAN), hardwire, wireless link, Intranet, etc.). In some embodiments, the network 150 can be implemented within a cloud computing environment, or using one or more cloud computing services. Consistent with various embodiments, a cloud computing environment may include a network-based, distributed data processing system that provides one or more cloud computing services. Further, a cloud computing environment may include many computers, hundreds or thousands of them, disposed within one or more data centers and configured to share resources over the network 150.

In some embodiments, host device 122 may include a question answering system 130 having a search application 134 and an answer module 132. The search application may be implemented by a conventional or other search engine, and may be distributed across multiple computer systems. The search application 134 may be configured to search one or more databases or other computer systems for content that is related to a question input by a user at a remote device 102, 112.

In some embodiments, remote devices 102, 112 enable users to submit questions (e.g., search requests or other user queries) to host devices 122 to retrieve search results. For example, the remote devices 102, 112 may include a query module 110, 120 (e.g., in the form of a web browser or any other suitable software module) and present a graphical user interface or other interface (e.g., command line prompts, menu screens, etc.) to solicit queries from users for submission to one or more host devices 122 and to display answers/results obtained from the host devices 122 in relation to such user queries.

Consistent with various embodiments, host device 122 and remote devices 102, 112 may be computer systems, and may be equipped with a display or monitor. The computer systems may include at least one processor 106, 116, 126; memories 108, 118, 128; internal or external network interface or communications devices 104, 114, 124 (e.g., modem, network cards, etc.); optional input devices (e.g., a keyboard, mouse, or other input device); and any commercially available or custom software (e.g., browser software, communications software, server software, natural language processing software, search engine and/or web crawling software, filter modules for filtering content based upon predefined criteria, etc.). In some embodiments, the computer systems may include servers, desktops, laptops, and hand-held devices. In addition, the answer module 132 may include one or more modules or units to perform the various functions of embodiments as described below (e.g., receiving an input question, determining a set of candidate answers, calculating temporal confidence subscores, etc.), and may be implemented by any combination of any quantity of software and/or hardware modules or units.

Figure 2:
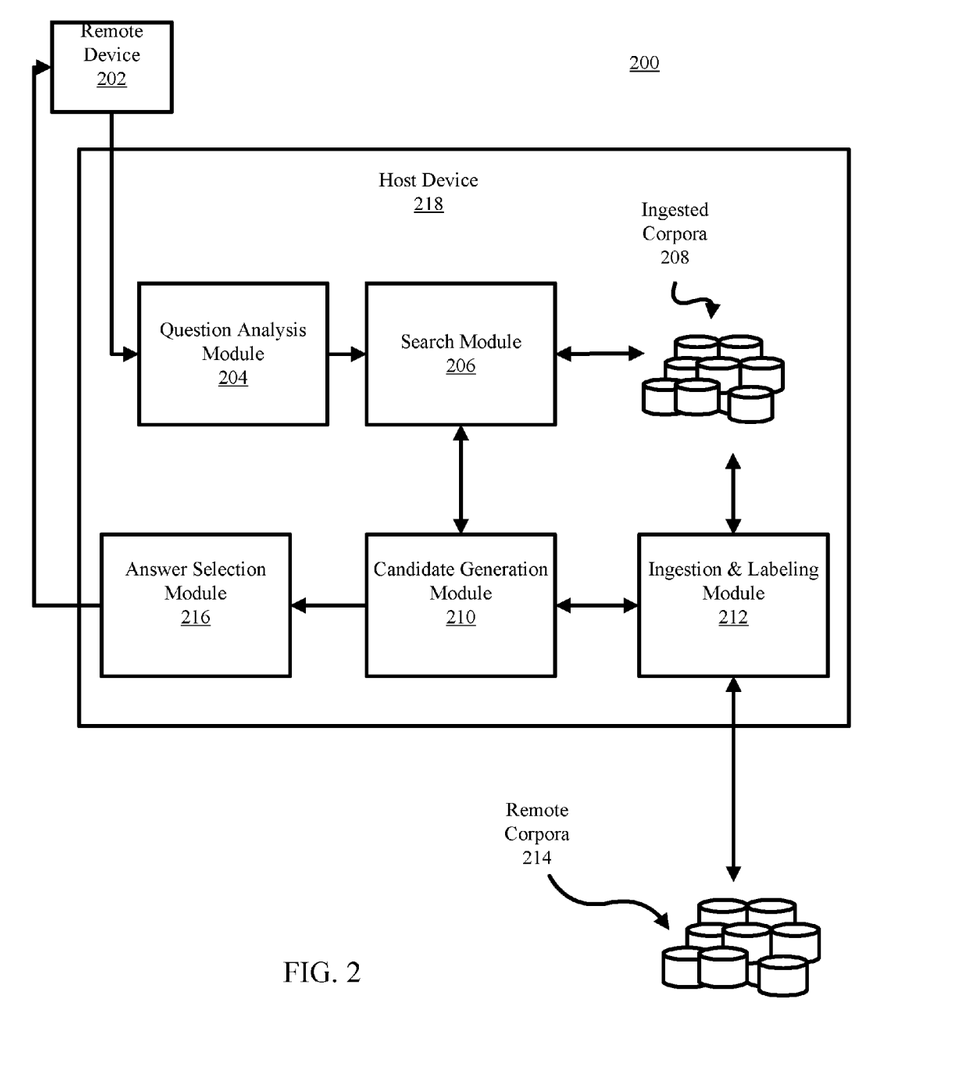
FIG. 2 illustrates a system diagram of an example high level logical architecture, consistent with embodiments of a question answering system of the present disclosure.

FIG. 2 illustrates a system diagram of an example high level logical architecture, consistent with embodiments of a question answering system 200 of the present disclosure. Aspects of FIG. 2 are directed toward components and modules for use with a QA system 200. In some embodiments, host device 218 and remote device 202 may be embodied by host device 122 and remote device 102 of FIG. 1, respectively. In some embodiments, the question analysis module 204, located on host device 218, may receive a natural language question from a remote device 202, and can analyze the question to produce information about the question based on its content and context type. The information produced by question analysis module 204 may include, for example, the semantic type of the expected answer. The search module 206 may formulate queries from the output of the question analysis module 204 and may consult various resources such as the internet or one or more knowledge resources, e.g., databases or corpora, to retrieve documents that are relevant to answering the user question. As used herein, documents may refer to various types of written, printed, or electronic matter (including passages, web-pages, database tuples, etc.) that provide information or evidence. As shown in FIG. 2, the search module 206 may consult ingested corpora 208. The candidate answer generation module 210 may then extract from the search results potential (candidate) answers to the question, which may then be scored and ranked by the answer selection module 216. A final answer, based on a comparison of various confidence scores and subscores associated with the candidate answers, may then be sent from the answer selection module 216 to remote device 202 for presentation to the user.

In some embodiments, an ingestion and labeling module 212 may be included in the host device 218. During normal operations of the system 200, the ingestion and labeling module 212 may regularly or periodically ingest documents or corpora of documents for addition to the ingested corpora 208. The documents may be ingested from one or more remote structured or unstructured sources of data, such as remote corpora 214. In some embodiments, once ingested, these documents can be labeled by the ingestion and labeling module 212, so as to indicate certain information about each document, including, for example, a publication date of the document and the type of information contained within the document. In some embodiments, during use of the system 200 to answer a question, the ingestion and labeling module 212 may be called upon to obtain an updated version of a relevant document in situations where the version of that document contained at that time within the ingested corpora 208 is deemed outdated. An embodiment of this update processing method is discussed in more detail below and shown in FIG. 6.

The various components and modules of the exemplary high level logical architecture for a QA system described above may be used to implement various aspects of the present disclosure. For example, the question analysis module 204 may, in some embodiments, be used to analyze an input question in order to determine whether it is time-sensitive or to determine a time frame for the question. Further, the search module 206 may, in some embodiments, be used to perform a search of ingested corpus 208 to obtain source documents useful for identifying candidate answers. Further, the candidate generation module 210 may, in some embodiments, be used to identify candidate answers and to calculate temporal confidence subscores and general confidence scores for the candidate answers. Further, ingestion and labeling module 212 may, in some embodiments, be used to ingest and label documents and updated versions of documents and to apply update rules to identified source documents. Further, the answer selection module 216 may, in some embodiments, be used in comparing candidate answers and selecting at least one candidate answer of the set of candidate answers as a final answer.

Figure 3:
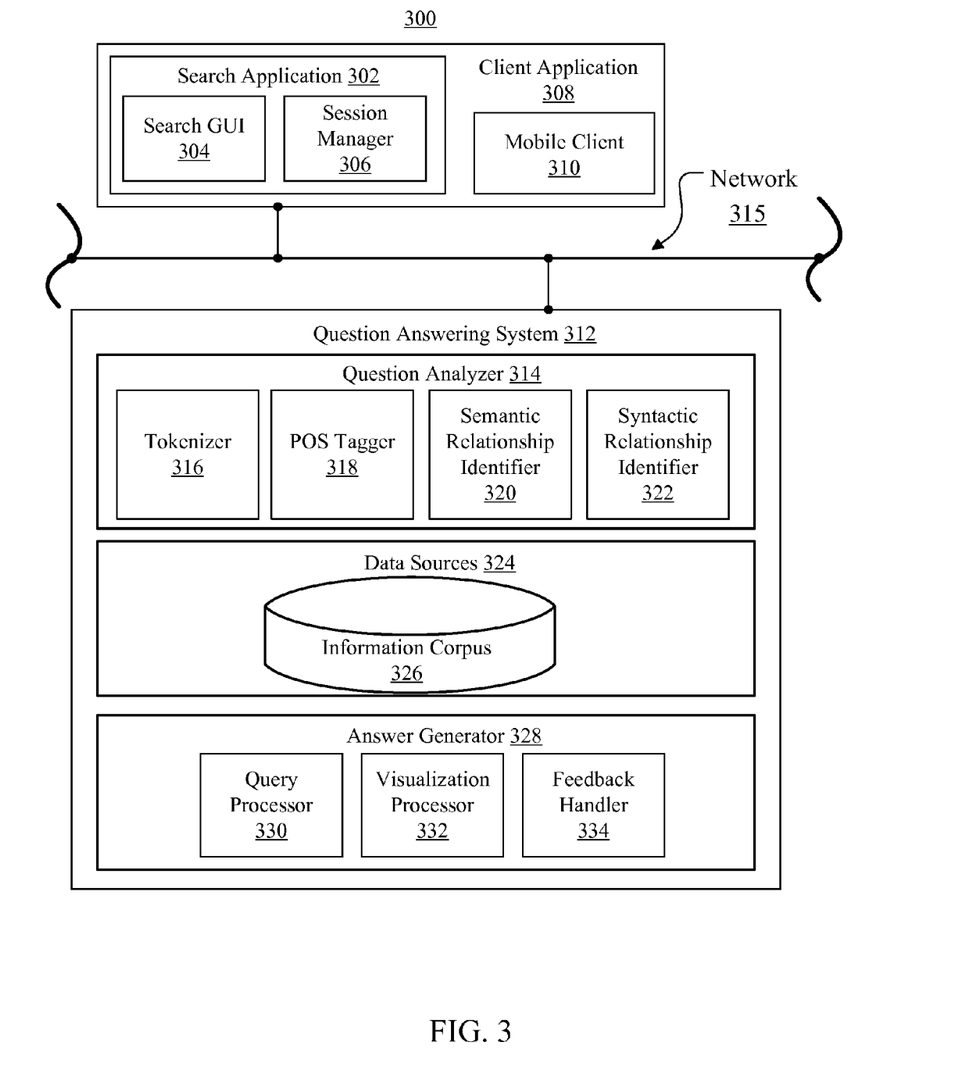
FIG. 3 illustrates a block diagram of an example question answering system usable to generate answers to one or more input questions, consistent with embodiments of the present disclosure.

Turning now to FIG. 3, illustrated is a block diagram of an example question answering system usable to generate answers to one or more input questions (for example, QA system 200 of FIG. 2), consistent with embodiments of the present disclosure. Aspects of FIG. 3 are directed toward an exemplary system architecture 300, including a question answering system 312 to generate answers to user queries (e.g., input questions). In some embodiments, one or more users can send requests for information to QA system 312 using a remote device (such as remote devices 102, 112 of FIG. 1). Such a remote device may include client applications 308 which may themselves involve one or more entities operable to generate information dispatched to QA system 312 via network 315. QA system 312 may be able to perform methods and techniques for responding to the requests sent by the one or more client applications 308. In some embodiments, the information received at QA system 312 may correspond to input questions received from users, where the input questions may be expressed in a free form and in natural language.

A question (similarly referred to herein as a user query) may be one or more words that form a search term or request for data, information, or knowledge. A question may be expressed in the form of one or more keywords. Questions may include various selection criteria and search terms. A question may be composed of complex linguistic features in addition to keywords. However, a keyword-based search for answers may also be possible. In some embodiments, using restricted syntax for questions posed by users may be enabled. The use of restricted syntax may result in a variety of alternative expressions that assist users in better stating their needs.

Consistent with various embodiments, client applications 308 may include one or more components, such as a mobile client 310. Client applications 308 may operate on a variety of devices. Such devices may include, but are not limited to, mobile and handheld devices (e.g., laptops, mobile phones, personal or enterprise digital assistants, and the like), personal computers, servers, or other computer systems that access the services and functionality provided by QA system 312. For example, mobile client 310 may be an application installed on a mobile or other handheld device. In some embodiments, mobile client 310 can dispatch user query requests to QA system 312.

Consistent with various embodiments, client applications 308 may also include search application 302, either as part of mobile client 310 or separately, that may perform several functions, including some or all of the above functions of mobile client 310 listed above. For example, in some embodiments, search application 302 may dispatch requests for information to QA system 312. In some embodiments, search application 302 may be a client application to QA system 312. In some embodiments, search application 302 can send requests for answers to QA system 312. Search application 302 may be installed on a personal computer, a server, or other computer system. In some embodiments, search application 302 may include a search graphical user interface (GUI) 304 and session manager 306. Users may enter questions in search GUI 304. In some embodiments, search GUI 304 may be a search box or other GUI component, the content of which can represent a question to be submitted to QA system 312. Users may authenticate to QA system 312 via session manager 306. In some embodiments, session manager 306 may keep track of user activity across sessions of interaction with the QA system 312. Session manager 306 may keep track of what questions are submitted within the lifecycle of a session of a user. For example, session manager 306 may retain a succession of questions posed by a user during a session. In some embodiments, answers produced by QA system 312 in response to questions posed throughout the course of a user session may also be retained. Information for sessions managed by session manager 306 may be shared between computer systems and devices.

In some embodiments, client applications 308 and QA system 312 may be communicatively coupled through network 315, e.g., the Internet, intranet, or other public or private computer network. In some embodiments, QA system 312 and client applications 308 may communicate by using Hypertext Transfer Protocol (HTTP) or Representational State Transfer (REST) calls. In some embodiments, QA system 312 may reside on a server node. Client applications 308 may establish server-client communication with QA system 312 or vice versa. In some embodiments, the network 315 can be implemented within a cloud computing environment, or using one or more cloud computing services. Consistent with various embodiments, a cloud computing environment may include a network-based, distributed data processing system that provides one or more cloud computing services.

Consistent with various embodiments, QA system 312 may respond to the requests for information sent by client applications 308 (e.g., questions posed by users). QA system 312 may generate answers to the received questions. In some embodiments, QA system 312 may include a question analyzer 314, data sources 324, and answer generator 328. Question analyzer 314 may be a computer module that analyzes the received questions. Question analyzer 314 may perform various methods and techniques for analyzing the questions syntactically and semantically. In some embodiments, question analyzer 314 can parse received questions. Question analyzer 314 may include various modules to perform analyses of received questions. For example, computer modules that question analyzer 314 may encompass include, but are not limited to, a tokenizer 316, part-of-speech (POS) tagger 318, semantic relationship identifier 320, and syntactic relationship identifier 322.

Consistent with various embodiments, tokenizer 316 may be a computer module that performs lexical analysis. Tokenizer 316 can convert a sequence of characters into a sequence of tokens. A token may be a string of characters typed by a user and categorized as a meaningful symbol. Further, in some embodiments, tokenizer 316 can identify word boundaries in an input question and break the question or any text into its component parts such as words, multi-word tokens, numbers, and punctuation marks. In some embodiments, tokenizer 316 can receive a string of characters, identify the lexemes in the string, and categorize them into tokens.

Consistent with various embodiments, POS tagger 318 may be a computer module that marks up a word in a text to correspond to a particular part of speech. POS tagger 318 can read a question or other text in natural language and assign a part of speech to each word or other token. POS tagger 318 can determine the part of speech to which a word corresponds based on the definition of the word and the context of the word. The context of a word may be based on its relationship with adjacent and related words in a phrase, sentence, question, or paragraph. In some embodiments, the context of a word may be dependent on one or more previously posed questions. Examples of parts of speech that may be assigned to words include, but are not limited to, nouns, verbs, adjectives, adverbs, and the like. Examples of other part of speech categories that POS tagger 318 may assign include, but are not limited to, comparative or superlative adverbs, wh-adverbs, conjunctions, determiners, negative particles, possessive markers, prepositions, wh-pronouns, and the like. In some embodiments, POS tagger 318 may tag or otherwise annotate tokens of a question with part of speech categories. In some embodiments, POS tagger 318 may tag tokens or words of a question to be parsed by QA system 312.

Consistent with various embodiments, semantic relationship identifier 320 may be a computer module that can identify semantic relationships of recognized entities in questions posed by users. In some embodiments, semantic relationship identifier 320 may determine functional dependencies between entities and other semantic relationships.

Consistent with various embodiments, syntactic relationship identifier 322 may be a computer module that can identify syntactic relationships in a question composed of tokens posed by users to QA system 312. Syntactic relationship identifier 322 can determine the grammatical structure of sentences, for example, which groups of words are associated as "phrases" and which word is the subject or object of a verb. Syntactic relationship identifier 322 may conform to formal grammar.

In some embodiments, question analyzer 314 may be a computer module that can parse a received user query and generate a corresponding data structure of the user query. For example, in response to receiving a question at QA system 312, question analyzer 314 may output the parsed question as a data structure. In some embodiments, the parsed question may be represented in the form of a parse tree or other graph structure. To generate the parsed question, question analyzer 314 may trigger computer modules 316-322. In some embodiments, question analyzer 130 of FIG. 1 may use functionality provided by computer modules 316-322 individually or in combination. Additionally, in some embodiments, question analyzer 314 may use external computer systems for dedicated tasks that are part of the question parsing process.

Consistent with various embodiments, the output of question analyzer 314 may be used by QA system 312 to perform a search of one or more data sources 324 to retrieve information to answer a question posed by a user. In some embodiments, data sources 324 may include data warehouses, information corpora, data models, and document repositories. In some embodiments, the data source 324 may include an information corpus 326. The information corpus 326 may enable data storage and retrieval. In some embodiments, the information corpus 326 may be a storage mechanism that houses a standardized, consistent, clean and integrated form of data. The data may be sourced from various operational systems. Data stored in the information corpus 326 may be structured in a way to specifically address reporting and analytic requirements. In some embodiments, the information corpus may be a relational database. In some example embodiments, data sources 324 may include one or more document repositories, for example, ingested corpora 208 of FIG. 2.

In some embodiments, answer generator 328 may be a computer module that generates answers to posed questions. Examples of answers generated by answer generator 328 may include, but are not limited to, answers in the form of natural language sentences; reports, charts, or other analytic representation; raw data; web pages; and the like.

Consistent with various embodiments, answer generator 328 may include query processor 330, visualization processor 332, and feedback handler 334. When information in a data source 324 matching a parsed question is located, a technical query associated with the pattern can be executed by query processor 330. Based on data retrieved by a technical query executed by query processor 330, visualization processor 332 may be able to render visualization of the retrieved data, where the visualization represents the answer. In some embodiments, visualization processor 332 may render various analytics to represent the answer including, but not limited to, images, charts, tables, dashboards, maps, and the like. In some embodiments, visualization processor 332 may present the answer to the user.

In some embodiments, feedback handler 334 may be a computer module that processes feedback from users on answers generated by answer generator 328. In some embodiments, users may be engaged in dialog with the QA system 312 to evaluate the relevance of received answers. Answer generator 328 may produce a list of answers (e.g., candidate answers or final answers) corresponding to a question submitted by a user. The user may rank each answer according to its relevance to the question. In some embodiments, the feedback of users on generated answers may be used for future question answering sessions.

The various components of the exemplary question answering system described above may be used to implement various aspects of the present disclosure. For example, the client application 308 could be used to receive an input question from a user. The question analyzer 314 could, in some embodiments, be used to analyze the input question to determine characteristic(s) about a set of answer types. Further, the query processor 330 or the answer generator 328 could, in some embodiments, be used to determine a set of candidate answers, calculate temporal confidence subscores and general confidence scores for the candidate answers, and ingest updated versions of outdated documents during answer generation.

Figure 4:
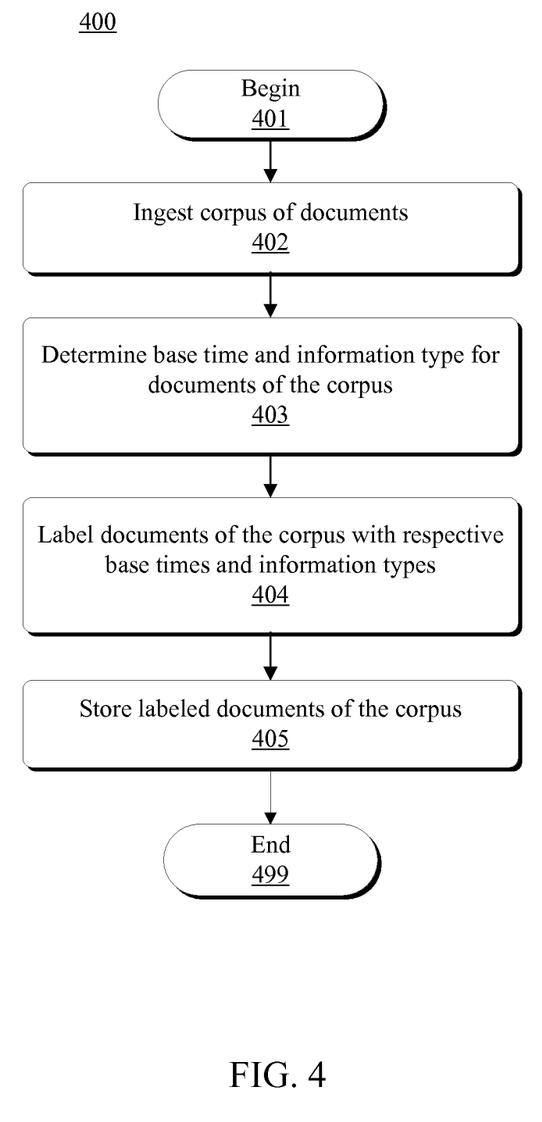
FIG. 4 illustrates a flowchart of an example method for regular ingestion and labeling of documents in a question answering system, consistent with embodiments of the present disclosure.

Turning to FIG. 4, shown is a flowchart illustrating an example method 400 for regular ingestion and labeling of documents in a question answering (QA) system, according to embodiments of the present invention. The method 400 begins at block 401. Per block 402, a corpus of documents may be ingested by a Question Answering System (such as system 200) or a document host (e.g., host device 218). The ingested corpus of documents may be structured or unstructured data and may come from one or more sources (e.g., remote corpora 214). The ingestion may be initiated at a user request or based on a regular ingestion schedule. In some embodiments, hundreds, thousands, or millions of documents can be ingested by the system and these documents may be ingested at the substantially the same time (i.e., during a single ingestion cycle) or may be ingested at different times. Upon being ingested, the system may, per block 403, determine a base time and information type for each ingested document. Both the base time and information type may be determined based on a pre-identification by another computer or by a human system operator or may be determined directly by the QA system by analyzing the documents. The base time for each document may be any time or date that is relevant to that particular document. Whether a given time is relevant to a particular document may depend on the document's type or the type of classification scheme used in the QA system. For example, if the document is a news article, then the appropriate base time for the document may be the date that the article was originally published. In another example, if the document includes a law or compilation of laws, then it may have the effective date of the laws (or compilation) as the appropriate base time. In yet another example, if the type of a document is unknown or of a general type, then an appropriate base time may be the date or date-time that the document is ingested.

Determining the information type for each ingested document at block 403 may be done in much the same manner as the determination of each document's base time. In some embodiments, the information type for each document may refer to the grouping or category of (or normally associated with) the data contained within the document. Examples of information types may include laws, events, news, mathematical concepts, finances, medicines, procedures, or scientific research. Many information types are possible. The number and identity of the possible information types that a given QA system can recognize may, in some embodiments, be predetermined based on a number of factors, which may include the use to which a particular QA system will be put. In some embodiments, there may be ten or more information types.

It is contemplated that some documents may not have known or knowable information types or base times. In some embodiments, these documents may still be ingested by a QA system and used for question answering. In some embodiments, these documents may be given default bases times (e.g., the ingestion date) or default information types (e.g., a general type) as may be applicable. In some embodiments, these documents may be separated into a different internal corpus from the documents that have known base times and information types.

Once the appropriate base time and information type are determined, the documents, per block 404, may be labeled with their respective base times and information types. A label may include any indicative marker upon a given document that can be used to associate the given document with its respective base time or information type. In some embodiments, the labeling may take the form of annotation with time-sensitive metadata. Finally, per block 405, the labeled documents may be stored for later use in question answering by the system. The storage repository for the documents may include any suitable local or remote memory storage device. The regular ingestion and labeling method 400 may conclude at block 499.

In some embodiments, the method 400 may occur at any suitable time and may be repeatable at periodic or irregular intervals. For example, a QA system may include a regularly-scheduled document ingestion process that occurs once a week. In another example, the QA system may include a document ingestion step upon the input of a new question by a user. In some embodiments, as new documents or new corpora are retrieved for ingestion and storage by the system, old documents may be deleted, or corpora may be combined or divided to promote searching efficiency.

Figure 5:
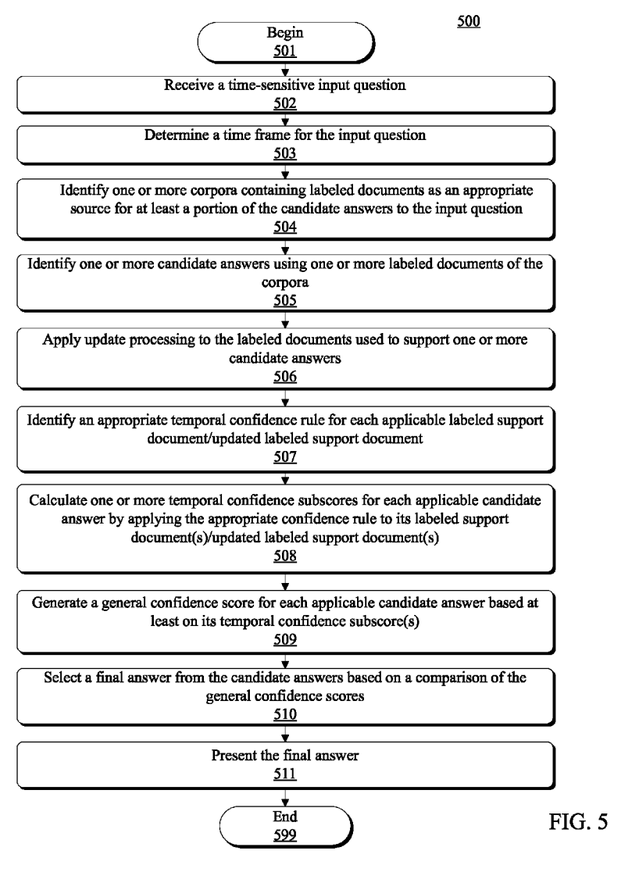
FIG. 5 illustrates a flowchart of an example method for answering a time-sensitive question, consistent with embodiments of the present disclosure.

A method 500 for answering a time-sensitive question according to embodiments of the present invention is represented by the flowchart of FIG. 5. The method 500 begins at block 501. At block 502, a time-sensitive input question is received by the QA system. The input question may have originated with a user, for example, through the query module 110, 120 of remote device 102, 112 of FIG. 1. The input question may be a set of words. The set of words may or may not form a sentence. The set of words may or may not include punctuation. The set of words may or may not be spelled correctly. In some embodiments, the input question may include audio, video, or still images. The information received by the QA system may include a set of data or a packet arriving at the QA system. For example, an input question could be, "My home in Grand Rapids, Mich. was built in 2010. How far apart should the stair railing balusters be?" For another example, the input question could be, "Who is the mayor of New York City?"

It is also contemplated that, in some embodiments, one or more questions that are not time sensitive may also be received by the QA system. To determine whether a given question is time sensitive, the QA system may rely on an analysis of the user question. This analysis may be performed, for example, by question analysis module 204 of FIG. 2, which may include question analyzer 314 of FIG. 3. The question analyzer 314 may use one or more components (e.g., components 316-322) that may be able to use one or more aspects of the content or context of a user question to determine whether it is time sensitive. A given question may be referred to as time sensitive when it has a strong connection with time or, more specifically, with a specific time period. A time-sensitive question may be recency sensitive or non-recency sensitive. It may be implicitly or explicitly time sensitive. A time-sensitive question may also refer to a question that is not time-insensitive (i.e., a question that has little or no connection with time or is not likely to change over an extended time period). An example of a time-insensitive question would be, "What is two plus two?"

At block 503, the system may determine a time frame for the input question. The time frame of the user question may refer to the particular time(s) or time period(s) to which the question is sensitive. For example, the time frame for the question, "My home in Grand Rapids, Mich. was built in 2010. How far apart should the stair railing balusters be?" may be the year 2010. In another example, the time frame for the question, "Who is the mayor of New York City?" may be the time or date when the question is posed by the user to the system. The system may determine the appropriate time frame for the input question in a similar manner to the way in which the time-sensitivity of the question may be determined, as described above (i.e., by analyzing the content and context of the question using various components of the system). In some embodiments, a default time frame can be applied to certain questions. The default time frame may be, for example, the date that the question is posed by the user.

At block 504, the QA system may identify one or more corpora containing labeled documents as an appropriate source for candidate answers to the input question. The identified documents or corpora may include those documents that were ingested and labeled by the system using one or more iterations of ingestion and labeling method 400. The identified documents or corpora may include, for example, documents of ingested corpora 208 of FIG. 2. Next, per block 505, the system may identify one or more candidate answers using one or more of the labeled documents. In this context, in some embodiments, identifying may refer to initially generating a candidate answer using one or more source documents; to supporting (using the one or more source documents) a candidate answer that was previously generated; or both. This identifying can be performed, for example, by either search module 206 or candidate generation module 210 of FIG. 2 (or both), relying on the output of the question analysis by module 204 of FIG. 2 to perform a search of the corpora identified in block 504. In some embodiments, a given labeled document may support more than one candidate answer and a candidate answer may be supported by one or more labeled documents. For example, applying the step of block 505 to the example question, "My home in Grand Rapids, Mich. was built in 2010. How far apart should the stair railing balusters be?", may result in the identification a first candidate answer of "no more than six inches apart", which may have as a supporting document a page from a treatise on Michigan local housing construction codes that was published in 2009. In this example, the document may be labeled with "law" as its information type and "2009" as its base time.

At block 506, update processing may occur for those documents relied upon in identifying the candidate answers to the question in 505. This update processing may occur, for example, via update processing method 600, discussed below and shown in FIG. 6. Next, per block 507, an appropriate temporal confidence rule may be identified for each applicable support document (or updated support document, if any). As used herein, a temporal confidence rule may refer to a rule (e.g., an algorithm, a set of algorithms, or a set of other procedures) that may rely on inputting values for variables, one or more of which may be related to time, in order to output a score that may be indicative of, among potentially other things, the value of a given support document in the context of supporting a given candidate answer to a given user question. More generally, a temporal confidence rule may be useful in determining a level of confidence in the correctness of a particular candidate answer to a given question based on time-related factors associated with a particular supporting document and the given question. Among other variables that may be relevant to a temporal confidence rule for a supporting document may be the question time frame and the base time of the document. Block 507, may occur, for example, in candidate generation module 210.

In some embodiments, each information type may be associated with a particular temporal confidence rule. In some embodiments, a particular temporal confidence rule may be associated with only one information type; in others, a particular temporal confidence rule may be associated with multiple information types. The temporal confidence rule associated with each information type may be predetermined prior to the entry of the user question. In some embodiments, the term of a useful life of a given document may vary widely based on its information type. For example, the temporal confidence rule associated with a "law" information type may provide for high levels of temporal confidence for long-term timeframe (e.g., a year or more from a base date) whereas another temporal confidence rule associated with a "news" information type may provide for high levels of temporal confidence in a document for only a short time or may provide for levels temporal confidence in a document that otherwise rapidly decay.

In some instances, it is contemplated that a candidate answer supported solely or partially by an older document (i.e., a document having an earlier base time) may not always be associated with less temporal confidence than another candidate answer supported solely or partially by a newer document (i.e., a document having a later base time). This may be the case for at least two reasons. First, the older document may be of a different information type than the newer document. For example, a candidate answer supported by a news article published in 2009 may be associated with less temporal confidence than another candidate answer supported by a law-type document published in 2008 because the relevance of the news article may decline much faster than the relevance of the law-type document. Second, less temporal confidence being associated with newer document may also be the case where the question time frame is older. For example, a candidate answer supported by a news article published in 2014 may be associated with less temporal confidence than a candidate answer supported by a news article published in 1994 when the question time frame is 1993.

At block 508, the QA system may, using for example candidate generation module 210 of FIG. 2, calculate one or more temporal confidence subscores for each candidate answer by applying the appropriate temporal confidence rule to each of its labeled support documents (or updated labeled support documents, if any). In some embodiments, a lower temporal confidence subscore may indicate less temporal confidence in a candidate answer. In some embodiments, a separate temporal subscore is calculated for each document supporting a particular answer. For example, a candidate answer with one labeled supporting document may have one temporal confidence subscore, while another candidate answer having three labeled supporting documents may have three temporal confidence subscores. In some embodiments, each temporal confidence subscore may be calculated by applying the appropriate temporal confidence rule for a given support document to the document's base time and to the time frame for the applicable user question. In some embodiments, not all supporting documents may be labeled with base times or information types. In these embodiments, the unlabeled support documents may still be relied upon to support candidate answers but a default temporal confidence subscore may be generated or the step of calculating a temporal confidence subscore may be foregone altogether for that particular supporting document.

Referring to the previous example (i.e., where the user question "My home in Grand Rapids, Mich. was built in 2010. How far apart should the stair railing balusters be?" generates a candidate answer of "no more than six inches apart" that is supported by a 2009 housing code treatise), blocks 507 and 508 may be applied to determine a temporal confidence subscore for that candidate answer. The temporal confidence rule associated with the "law" information type may be identified as the correct rule and it may be applied to the base time of the supporting treatise (i.e., 2009) and the time frame of the question (i.e., 2010) to result in a temporal confidence subscore for the candidate answer "no more than six inches apart". In this example, the temporal confidence subscore may indicate a somewhat high degree of confidence given that a temporal confidence rule associated with a "law" information type may have a relatively slow decay of confidence and the difference between the base time of the document and the time frame of the question may be considered relatively short (i.e., only a year), given that relatively slow decay of confidence. To continue the example, if there were other labeled supporting documents for the candidate answer "no more than six inches apart" then additional temporal confidence subscores might be calculated for that candidate answer.

At block 509, using, for example, candidate generation module 210 of FIG. 2, a general confidence score may be generated for each applicable candidate answer based at least on its temporal confidence subscore(s). In some embodiments, each general confidence score may indicate a level of confidence in a given candidate answer based on a number of factors and each factor may be given its own type of confidence subscore. These factors may include, for example, the trustworthiness of a supporting document's source, the content of a supporting document, the content of a candidate answer, the similarity of context of a supporting document with the context of an applicable user question, etc. It is contemplated that factors may be weighted differently and that not all factors may be applicable to every candidate answer. For example, if no temporal confidence subscore is calculated for any supporting documents for a particular candidate answer, then that factor may not be considered in calculating a general confidence score for that candidate answer.

It is further contemplated that a candidate answer with a higher temporal confidence subscore may not always have a higher general confidence score than another candidate answer with a lower temporal confidence subscore. This may occur in instances where other factors weigh more heavily in favor of the latter candidate answer. Referring again to the housing code example, a candidate answer supported by a 2010 housing code volume for Grand Rapids, Minn. may have a higher temporal confidence subscore than another candidate answer based on a 2000 housing code volume for Grand Rapids, Mich., but the latter may still have a higher general confidence score (because only the second document relates to the correct city).

At block 510, a final answer may be selected from the candidate answers, for example, by answer selection module 216 of FIG. 2. The final answer may be selected based on having the highest general confidence score of the candidate answers. At block 511, the answer may be presented to the user, for example, via a user interface of remote device 202 of FIG. 2. In some embodiments, multiple final answers may be selected and the general confidence score for each final answer may be presented to the user along with each final answer. The method 500 concludes at block 599.

Figure 6:
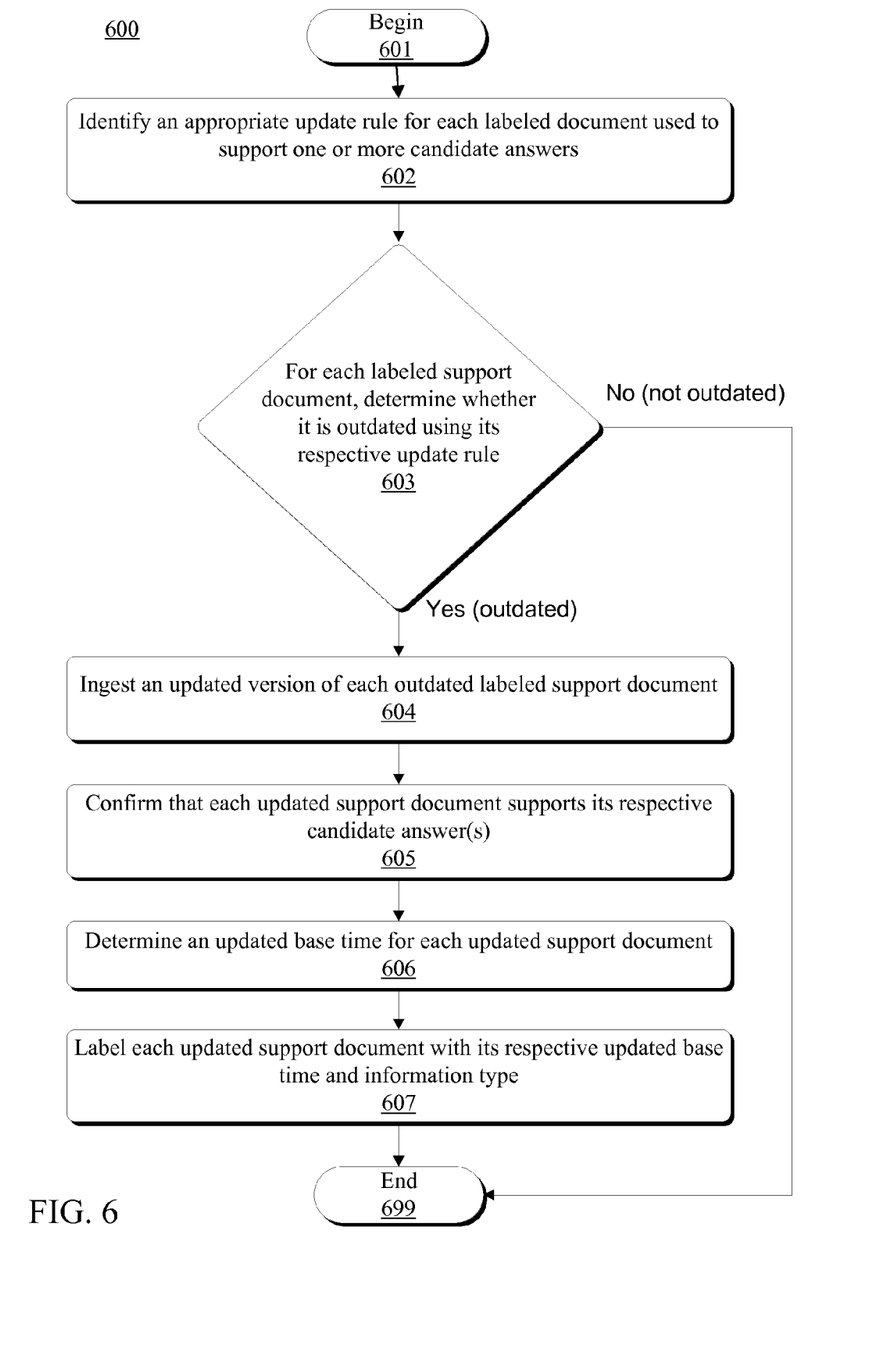
FIG. 6 illustrates a flowchart of an example method of updating labeled documents used to support one or more candidate answers to an input question, consistent with embodiments of the present disclosure.

FIG. 6 is a flow chart for an example method 600 of updating labeled documents used to support one or more candidate answers to an input question, according to an embodiment of the present invention. In some embodiments, method 600 may be performed by ingestion and labeling module 212 of FIG. 2. Method 600 begins at block 601. In some embodiments, for example embodiments corresponding to method 500 of FIG. 5, method 600 may occur after one or more candidate answers to a user question have been identified using one or more labeled support documents. In block 602, an appropriate update rule may be identified for each applicable labeled document. This may be done in a manner similar to the manner in which appropriate temporal confidence rules are identified in block 507 of method 500. An update rule may refer to a rule (e.g., an algorithm, a set of algorithms, or a set of other procedures) that may rely on inputting values for variables, one or more of which may be related to time, in order to determine whether a given support document is outdated or stale. In some embodiments, a given update rule may be used to determine whether a given document is older than a threshold age, wherein the threshold age may be different for different update rules. Among other variables that may be relevant to an update rule for a supporting document may be the base time of the document and, in some embodiments, the time frame of the applicable user question.

In some embodiments, each information type may be associated with a particular update rule. In some embodiments, a particular update rule may be associated with only one information type; in others, a particular update rule may be associated with multiple information types. The update rule associated with each information type may be predetermined prior to the entry of the user question. In some embodiments, the effect of applying different update rules may vary widely. For example, the update rule associated with a "law" information type may provide that a document of that type needs to be updated infrequently (e.g., only needs to be updated two years or more from its base date) whereas another update rule associated with a "news" information type may provide that a document of that type needs to be updated frequently (e.g., needs to be updated within two weeks of its base date).

Next, per decision block 603, a determination may be made for each labeled document used to support a candidate answer as to whether the document is outdated. This may be done by applying the appropriate update rule (for the given document's information type) to the base time of the document. Each applicable document that is not determined to be outdated pursuant to the update rule, may require no further update processing and may, in some embodiments, be deemed to have completed update processing method 600, per block 699. For each document that is determined to be outdated, an updated version of the document may be ingested and processed per blocks 604 to 607. This portion of method 600 may be analogous to regular ingestion and labeling method 400. Per block 604, an updated version of an outdated support document may be ingested by the QA system. This may occur, for example, using ingestion and labeling module 212 of FIG. 2. In some embodiments, if a suitable updated document cannot be located, the outdated source document may be discarded and not relied upon in supporting any candidate answer; in other embodiments, the inability to locate a suitable update document may result in the outdated source document still being used in supporting one or more candidate answers, as though it were not outdated.

Upon being located and ingested, the system may, per block 605, confirm that the updated support document supports the candidate answer that was previously supported by its counterpart outdated or stale support document. This may be performed, for example, by ingestion and labeling module 212 or candidate generation module 210 (or both), relying on the output of the question analysis module 204 in order to compare the updated support document with the applicable candidate answer. In some embodiments, if the updated support document does not support the candidate answer, then the candidate answer may be discarded and/or a new candidate answer may be generated.

Per block 606, an updated base time may be determined for each updated source document. In some embodiments, the determination of each updated base time may be done in an identical manner to the determination of each base time during regular ingestion of source documents (for example, as is done in method 400). Per block 607, each updated support document may be labeled with its updated base time and its information type. This may be done, for example, in the same manner as the labeling of source documents during regular ingestion and labeling method 400. In some embodiments, the information type of the updated source document may remain the same as it was for its respective stale source document. Method 600 is completed per block 699. In some embodiments, the updated source documents and outdated support documents for which no updated version could be located may then be used to generate an answer for a user question in, for example, blocks 507 to 511 of method 500.

In some embodiments, support documents that do not have known or knowable information types or base times may still be updated. In some embodiments, these documents may be given default bases times (e.g., the ingestion date) or default information types (e.g., a general type) as may be applicable, and update rules may be applied to these documents in accordance with their default base times or information types. Further, in some embodiments, updated labeled documents may be stored for later use in question answering by the system. The storage repository for these documents may include any suitable local or remote memory storage device.

In some embodiments, the method 600 may occur at any suitable time and may be repeatable at periodic or irregular intervals (i.e., rather than only updating a given labeled document when it is relied upon as a source document). For example, a QA system may include a regularly-scheduled document update process that occurs once a week, with newly stale documents being replaced or supplemented by updated versions.

For some embodiments, or in certain situations, all or a portion of update processing method 600 may not be applied to a given source document. This may occur, for instance, when the question time frame is not recent. In such a situation, a document that might otherwise be deemed outdated or stale may be appropriate given its age relative to the time frame of the input question.

As discussed in more detail below, except where indicated to the contrary, it is contemplated that some or all of the steps of some of the embodiments of methods described herein may be performed in alternative orders or multiple steps may occur at the same time or as an internal part of a larger process. For example, per blocks 508 and 509 of method 500, a temporal confidence subscore for a candidate answer may, in some embodiments, be calculated as part of the process of generating a general confidence score for the candidate answer, rather than as a separate step having its own distinct output.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for answering a time-sensitive question received by a computer system, the method comprising:
    identifying a first candidate answer to the time-sensitive question with a first document;
    calculating a first temporal confidence subscore of the first candidate answer with a first temporal confidence rule;
    generating a first general confidence score of the first candidate answer, the first general confidence score being based on at least the first temporal confidence subscore;
    identifying a second candidate answer to the time-sensitive question with a second document;
    calculating a second temporal confidence subscore of the second candidate answer with a second temporal confidence rule;
    generating a second general confidence score of the second candidate answer, the second general confidence score being based on at least the second temporal confidence subscore;
    comparing the first general confidence score and the second general confidence score; and
    selecting a final answer from the first candidate answer and the second candidate answer based on the comparison of the general confidence scores.

2. The method of claim 1, wherein the time-sensitive question has a question time frame, wherein the first document has a first base time and a first information type, the first information type being associated with the first temporal confidence rule, and wherein the second document has a second base time and a second information type, the second information type being associated with the second temporal confidence rule, the method further comprising:
    the calculating the first temporal confidence subscore of the first candidate answer with the first temporal confidence rule comprising:
        applying the first temporal confidence rule to the first base time and the question time frame; and
    the calculating the second temporal confidence subscore of the second candidate answer with the second temporal confidence rule comprising:
        applying the second temporal confidence rule to the second base time and the question time frame.

3. The method of claim 2, wherein the first information type is further associated with a first update rule, the method further comprising:
    applying the first update rule to at least the first base time;
    determining, based on the application of the first update rule to at least the first base time, that the first document is outdated; and
    in response to determining that the first document is outdated, ingesting an updated version of the first document, the updated version of the first document having an updated base time and the first information type.

4. The method of claim 3, wherein the second information type is further associated with a second update rule, and wherein the first base time is more recent than the second base time, the method further comprising:
    after determining that the first document is outdated, determining that the second document is not outdated by applying the second update rule to at least the second base time.

5. The method of claim 3, wherein the at least the first base time comprises the first base time and the question time frame.

6. The method of claim 2, wherein the first base time is more recent than the second base time, and wherein the first temporal confidence subscore indicates a lesser degree of confidence than the second temporal confidence subscore.

7. The method of claim 2, further comprising:
    ingesting a plurality of source documents, the plurality of source documents including the first document and the second document; and
    labeling each of the plurality of source documents with a base time and one of a plurality of information types, the plurality of information types including the first information type and the second information type, each of the plurality of information types being associated with one of a plurality of temporal confidence rules, the plurality of temporal confidence rules including the first temporal confidence rule and the second temporal confidence rule.

8. The method of claim 7, wherein the plurality of source documents comprises at least one thousand source documents, and wherein the plurality of information types comprises at least ten information types.

9. The method of claim 2, wherein the first information type and second information type are different.

10. The method of claim 2, wherein the at least the first temporal confidence subscore comprises the first temporal confidence subscore and a third temporal confidence subscore, the method further comprising:
    supporting the first candidate answer with a third document, the third document having a third base time and a third information type, the third information type being associated with a third temporal confidence rule; and
    calculating the third temporal confidence subscore by applying the third temporal confidence rule to the third base time and the question time frame.

11. The method of claim 2, wherein the at least the first temporal confidence subscore comprises the first temporal confidence subscore and a third temporal confidence subscore, the method further comprising:
    identifying a third document as relevant to the first candidate answer, the third document having a third base time and a third information type, the third information type being associated with a third temporal confidence rule and a third update rule;
    subsequent to identifying the third document as relevant to the first candidate answer, applying the third update rule to at least the third base time to determine that the third document is outdated;
    in response to determining that the third document is outdated, obtaining an updated version of the third document, the updated version of the third document having a updated third base time and the third information type; and
    calculating the third temporal confidence subscore by applying the third temporal confidence rule to the updated third base time and the question time frame.

* * * * *